United States Patent
Liu et al.

(10) Patent No.: US 10,484,485 B2
(45) Date of Patent: *Nov. 19, 2019

(54) CONTEXT-AWARE TASK PROCESSING FOR MULTIPLE DEVICES

(71) Applicant: International Business Machines Corporation, Armonk, NY (US)

(72) Inventors: Su Liu, Austin, TX (US); Eric J. Rozner, Austin, TX (US); Chin Ngai Sze, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,445

(22) Filed: Apr. 28, 2016

(65) Prior Publication Data

US 2017/0230304 A1 Aug. 10, 2017

Related U.S. Application Data

(63) Continuation of application No. 15/017,423, filed on Feb. 5, 2016.

(51) Int. Cl.
*H04L 29/08* (2006.01)

(52) U.S. Cl.
CPC .............. *H04L 67/16* (2013.01); *H04L 67/10* (2013.01); *H04L 67/14* (2013.01)

(58) Field of Classification Search
CPC ......... G06F 9/5011–5077; H04L 67/10; H04L 67/16; H04L 67/32; H04L 67/322; H04L 47/70; H04L 47/76; H04W 88/02
See application file for complete search history.

(56) References Cited

U.S. PATENT DOCUMENTS

| 4,796,255 A | 1/1989 | Westbrook et al. |
| 5,930,823 A | 7/1999 | Ito et al. |

(Continued)

FOREIGN PATENT DOCUMENTS

| WO | 2013133533 A1 | 9/2013 |
| WO | 2013153260 A1 | 10/2013 |

OTHER PUBLICATIONS

S. Mahmoodi et al., "Cloud Offloading for Multi-Radio Enabled Mobile Devices", IEEE International Conference on Communication, Jun. 2015, 6 pages. <http://web.stevens.edu/ses/documents/fileadmin/documents/pdf/sem-kps-vs-15.pdf>.

(Continued)

*Primary Examiner* — Lance Leonard Barry
(74) *Attorney, Agent, or Firm* — Patterson + Sheridan, LLP

(57) ABSTRACT

The present disclosure relates to processing tasks offloaded from one or more user devices to a cloud service. An example method generally includes receiving a command to be processed by the cloud service from a first device of a group of user devices. The cloud service generates a response based on the command. The cloud service determines weighting scores for each device in the group of user devices for each of audio output, video output, and haptic feedback based on context information about the group of user devices. The cloud service selects a plurality of user devices to receive at least part of the response based on the determined weighting scores, partitions the response into portions corresponding to the selected plurality of user devices, and instructs each of the selected plurality of user devices to output the one or more portions corresponding to the selected plurality of user devices.

6 Claims, 6 Drawing Sheets

(56) References Cited

U.S. PATENT DOCUMENTS

| | | |
|---|---|---|
| 6,219,645 B1 | 4/2001 | Byers |
| 6,477,117 B1 | 11/2002 | Narayanaswami et al. |
| 6,535,854 B2 | 3/2003 | Buchner et al. |
| 6,721,705 B2 * | 4/2004 | Kurganov ............ H04M 3/4938 704/270 |
| 7,081,905 B1 | 7/2006 | Raghunath |
| 7,146,492 B2 | 12/2006 | Bolt |
| 7,613,841 B2 | 11/2009 | Asano et al. |
| 7,839,269 B2 | 11/2010 | Steger et al. |
| 8,031,172 B2 | 10/2011 | Kruse et al. |
| 8,093,995 B2 | 1/2012 | Steger et al. |
| 8,271,287 B1 | 9/2012 | Kermani |
| 8,340,975 B1 | 12/2012 | Rosenberger |
| 8,378,795 B2 | 2/2013 | Steger et al. |
| 8,553,625 B2 | 10/2013 | Shao et al. |
| 8,601,518 B1 | 12/2013 | Wen et al. |
| 8,713,119 B2 | 4/2014 | Lindahl |
| 8,812,325 B2 | 8/2014 | Burns et al. |
| 8,819,170 B2 | 8/2014 | Cohen et al. |
| 8,924,219 B1 | 12/2014 | Bringert et al. |
| 9,024,257 B2 | 5/2015 | Omino |
| 9,239,740 B2 | 1/2016 | Zhao et al. |
| 9,363,725 B2 | 6/2016 | Patel et al. |
| 9,411,612 B2 | 8/2016 | Balakrishnan |
| 9,454,898 B2 | 9/2016 | Kim et al. |
| 2003/0120486 A1 | 6/2003 | Brittan et al. |
| 2003/0236099 A1 | 12/2003 | Deisher et al. |
| 2004/0153319 A1 | 8/2004 | Yacoub |
| 2005/0080800 A1 * | 4/2005 | Parupudi ............ G06F 17/30241 |
| 2007/0112563 A1 * | 5/2007 | Krantz .................... G10L 25/69 704/216 |
| 2008/0066183 A1 | 3/2008 | George et al. |
| 2008/0242288 A1 | 10/2008 | Guyette |
| 2008/0243513 A1 * | 10/2008 | Bucchieri ............ G09B 21/009 704/270 |
| 2009/0243959 A1 * | 10/2009 | Pering .................... G06F 3/1423 345/1.3 |
| 2009/0249029 A1 | 10/2009 | Liu et al. |
| 2010/0250677 A1 * | 9/2010 | Kahan ................ H04L 12/1859 709/204 |
| 2011/0145417 A1 | 6/2011 | Tamura |
| 2013/0053148 A1 * | 2/2013 | Nelson .................. G07F 17/323 463/42 |
| 2013/0325994 A1 | 12/2013 | Chai et al. |
| 2014/0033269 A1 | 1/2014 | Poornachandran et al. |
| 2014/0040445 A1 * | 2/2014 | Beckert ............... H04L 67/2823 709/223 |
| 2014/0171064 A1 * | 6/2014 | Das ....................... H04W 84/18 455/426.1 |
| 2014/0218184 A1 | 8/2014 | Grant et al. |
| 2014/0241540 A1 | 8/2014 | Hodges et al. |
| 2014/0244271 A1 | 8/2014 | Lindahl |
| 2014/0278438 A1 * | 9/2014 | Hart ........................ G06F 3/167 704/275 |
| 2014/0280990 A1 | 9/2014 | Dove et al. |
| 2014/0348327 A1 | 11/2014 | Linde et al. |
| 2015/0161253 A1 * | 6/2015 | Shah .................. G06F 17/2247 715/234 |
| 2015/0215350 A1 | 7/2015 | Slayton et al. |
| 2015/0286813 A1 | 10/2015 | Jakobsson |
| 2015/0288629 A1 | 10/2015 | Choi et al. |
| 2015/0289217 A1 | 10/2015 | Ban et al. |
| 2015/0289308 A1 | 10/2015 | Kang et al. |
| 2015/0301574 A1 | 10/2015 | Kim et al. |
| 2015/0358767 A1 | 12/2015 | Luna et al. |
| 2015/0358768 A1 | 12/2015 | Luna et al. |
| 2016/0013980 A1 | 1/2016 | McKnight et al. |
| 2016/0049147 A1 | 2/2016 | Anderson |
| 2016/0080941 A1 | 3/2016 | Jakobsson et al. |
| 2016/0157087 A1 | 6/2016 | Lee et al. |
| 2016/0179066 A1 | 6/2016 | Chadwick et al. |
| 2016/0179462 A1 | 6/2016 | Bjorkengren |
| 2016/0335263 A1 | 11/2016 | Yin et al. |
| 2016/0358471 A1 | 12/2016 | Hajj et al. |
| 2016/0358474 A1 | 12/2016 | Uppal |
| 2016/0359666 A1 | 12/2016 | Ledwith et al. |

OTHER PUBLICATIONS

K. Sinha et al., "Techniques for fine-grained, multi-site computation offloading", in Cluster, Cloud and Grid Computing (CCGrid), 2011 11th IEEE/ACM International Symposium on, 2011, pp. 184-194. <https://engineering.purdue.edu/~milind/docs/ccgrid11.pdf>.

E. Cuervo et al., "MAUI: Making Smartphones Last Longer with Code Offload", MobiSys'10, Jun. 15-18, 2010, San Francisco, California, USA, 14 pages.

M. Ra et al., "Odessa: Enabling Interactive Perception Applications on Mobile Devices", MobiSys'11, Jun. 28-Jul. 1, 2011, Bethesda, Maryland, USA, 14 pages.

L. Xiang et al., "Ready, Set, Go: Coalesced Offloading from Mobile Devices to the Cloud", IEEE Infocom 2014, IEEE Conference on Computer Communications, pp. 2373-2381. <http://iqua.ece.toronto.edu/papers/lxiang-infocom14.pdf>.

I. Zhang et al., "Customizable and Extensible Deployment for Mobile/Cloud Applications", 11th USENIX Symposium on Operating Systems Design and Implementation, Oct. 6-8, 2014, 17 pages. <https://www.usenix.org/system/files/conference/osdi14/osdi14-paper-zhang.pdf>.

C. Shi et al., "COSMOS: Computation Offloading as a Service for Mobile Devices", MobiHoc'14, Aug. 11-14, 2014, Philadelphia, PA, USA, 10 pages. <http://www.cc.gatech.edu/~khabak3/papers/COSMOS-MobiHoc'14.pdf>.

H. La et al., "A Conceptual Framework for Provisioning Context-aware Mobile Cloud Services", 2010 IEEE 3rd International Conference on Cloud Computing, 8 pages. <http://www.academicroom.com/article/conceptual-framework-provisioning-context-aware-mobile-cloud-services>.

Matti Kemppainen "Mobile Computation Offloading: a Context-driven Approach", Aalto University T-110.5190 Seminar on Internetworking, Spring 2011, 10 pages. <http://www.cse.tkk.fi/fi/opinnot/T-110.5121/2013/lisatty-files/T-110_5121_mobile_computation_offloading_a_context-driven.pdf>.

C. Mavromoustakis et al., "Context-oriented opportunistic cloud offload processing for energy conservation in wireless devices", 2014 IEEE Globecom Workshops, Dec. 8-12, 2014, Austin, TX, USA, pp. 24-30 [Abstract only].

Kevin Spain, "The Next Billion-Dollar Market Opportunity is Mobile Enterprise", Mar. 30, 2015, TechCrunch.com, 12 pages. <http://techcrunch.com/2015/03/30/the-next-billion-dollar-market-opportunity-is-mobile-enterprise/>.

Cisco, "Cisco Visual Networking Index: Global Mobile Data Traffic Forecast Update, 2015-2020", White Paper, Feb. 3, 2016, 39 pages. <http://www.cisco.com/c/en/us/solutions/collateral/service-provider/visual-networking-index-vni/mobile-white-paper-c11-520862.html>.

Statista The Statistics Portal, "Number of connected devices used per person in selected countries 2014", retrieved Apr. 27, 2016, 4 pages. <http://www.statista.com/statistics/333861/connected-devices-per-person-in-selected-countries/>.

U.S. Appl. No. 15/017,423, Entitled "Context-Aware Task Processing for Multiple Devices", filed Feb. 5, 2016.

U.S. Appl. No. 15/017,399, Entitled "Context-Aware Task Offloading Among Multiple Devices", filed Feb. 5, 2016.

U.S. Appl. No. 15/089,848, Entitled "Context-Aware Task Offloading Among Multiple Devices", filed Apr. 4, 2016.

List of IBM Patents or Patent Applications Treated As Related.

\* cited by examiner

CONTEXT-AWARE TASK PROCESSING FOR MULTIPLE DEVICES

CROSS-REFERENCE TO RELATED APPLICATIONS

This application is a continuation of co-pending U.S. patent application Ser. No. 15/017,423, filed Feb. 5, 2016. The aforementioned related patent application is herein incorporated by reference in its entirety.

BACKGROUND

The present invention relates to processing offloaded computing tasks from connected devices (e.g., mobile phones, tablets, wearable devices, and so on), and more specifically to selecting a number of devices to receive at least a portion of a response from the cloud service.

For various reasons, computing systems may offload computational tasks for processing on a cloud service, or a remote system (or cluster of systems) that provides computational services to requesting user devices. Typically, tasks offloaded to a remote system are computationally expensive (e.g., parsing a vocal input for an executable command or a query, facial/image recognition, authentication, and so on) and may need connectivity to multiple information sources. Offloading such tasks from a client system to a cloud service may reduce power usage at the client system, increase battery life for mobile user devices, and provide for higher performance by performing tasks on a system with greater processing capabilities.

In a typical device environment, multiple devices may be able to obtain input that can be used to generate a command to be offloaded to a cloud system. For example, a tablet, smartphone, and a wearable device (e.g., a smartwatch) that are collocated with each other may each be able to obtain voice input to be processed by a cloud service. Some devices may be connected to a cloud service through an external network connection, while other devices may only be able to transmit a command through another device with an external network condition.

In some cases, devices may activate when a user says a predetermined command (e.g., "Hey Siri"). A number of collocated devices can activate when the user says the predetermined command and generate a query for processing by the cloud service. However, not all of the collocated devices may need to process the query and offload the query to the cloud service.

Users often have multiple devices that can transmit a command to be offloaded to a cloud service. Each device generally has its own display and feedback capabilities (e.g., haptic feedback, audio feedback, and so on). Additionally, each device may have a different form factor that can perform certain tasks (e.g., notifying a user) for a given context, which may be determined from sensor data, imaging devices, and/or other information gathered at the device. For example, a tablet may be suited for displaying video to a user, while a wearable device may be suited for providing haptic feedback to a user.

Generally, multiple user devices can associate with the same local network to allow for coordination of services across the multiple devices. In some cases, some devices may not be able to connect to an external network itself, but may use a bridge (e.g., a cellular phone or cellular data-enabled tablet) to connect to an external network. These devices can offload commands to a cloud service by transmitting the command to the bridge device, which then transmits the command to the cloud service.

Cloud services typically receive a command from a user device with data identifying the user device or a group of user devices that are the source of the command. After the cloud service finishes processing the command and generates a response, the cloud service can either send the response to the specific requesting device or the group of devices.

SUMMARY

One embodiment disclosed herein includes a method for processing commands offloaded from a user device to a cloud service. The method generally includes receiving a command to be processed by the cloud service. The cloud service generates a response based on the command and selects one or more user devices to receive at least part of the response. The cloud service selects the one or more user devices based, at least in part, on context information about the one or more user devices. The cloud service partitions the response into one or more portions corresponding to each of the one or more user devices based on the selecting and transmits the one or more portions to the corresponding one or more selected user devices.

Another embodiment includes a computer-readable storage medium having instructions, which, when executed on a processor, performs an operation for processing commands offloaded from a user device to a cloud service. The operations generally includes receiving a command to be processed by the cloud service. The cloud service generates a response based on the command and selects one or more user devices to receive at least part of the response. The cloud service selects the one or more user devices based, at least in part, on context information about the one or more user devices. The cloud service partitions the response into one or more portions corresponding to each of the one or more user devices based on the selecting and transmits the one or more portions to the corresponding one or more selected user devices.

Still another embodiment includes a processor and a memory storing a program, which, when executed on the processor, performs an operation for processing commands offloaded from a user device to a cloud service. The operations generally includes receiving a command to be processed by the cloud service. The cloud service generates a response based on the command and selects one or more user devices to receive at least part of the response. The cloud service selects the one or more user devices based, at least in part, on context information about the one or more user devices. The cloud service partitions the response into one or more portions corresponding to each of the one or more user devices based on the selecting and transmits the one or more portions to the corresponding one or more selected user devices.

DETAILED DESCRIPTION

Embodiments presented herein describe techniques for processing computing tasks offloaded from a plurality of user devices and generating a partitioned response for output on one or more devices in a network based, at least in part, on context information associated with each of the user devices in the network. By using context information associated with each device in a network to partition a response into a plurality of discrete parts, a cloud service can partition a response into portions that, together, allow a number of user devices to work together in context to provide a response to a user query.

Figure 1:
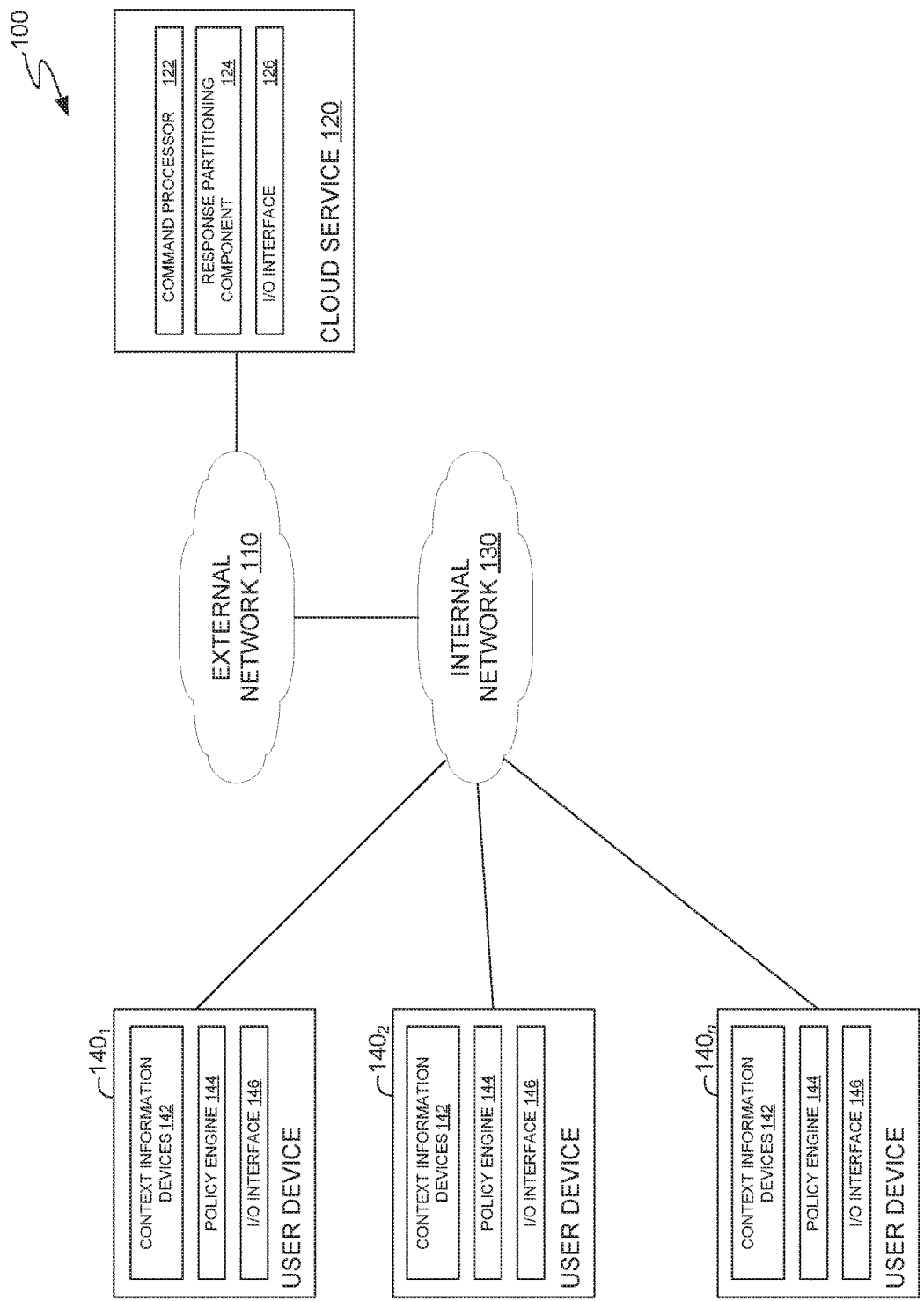
FIG. 1 illustrates an example computing system in which commands are offloaded from a user device to a cloud service, according to one embodiment.

FIG. 1 illustrates an example computing environment in which peer devices in a local network selectively offload commands to a cloud service, according to an embodiment. As illustrated, the computing environment includes a cloud service 120 and a plurality of user devices 140. The plurality of user devices 140 are connected to internal network 130, and cloud service 120 and internal network 130 are connected to an external network 110.

Cloud service 120 generally receives user commands from one or more user devices 140 for processing and provides a response to the one or more user devices 140. Cloud service 120 may be implemented as a distributed system in which multiple computing systems cooperate to parse a received command and generate a response.

As illustrated, cloud service 120 generally includes a command processor 122, a response partitioning component 124, and an I/O interface 126. Command processor 122 generally parses commands received from a user device 140 and generates a query from the parsed command. For example, command processor 122 may receive an audio file (e.g., a WAV file) from a user device 140, perform voice recognition on the audio file to obtain a parseable string, and generate a query for further processing from the parseable string.

Based on the query, command processor 122 can direct the query to execute on one or more other services. For example, command processor 122 can search the web generally in response to a query asking "what is the meaning of life, the universe, and everything?" In contrast, command processor 122 can direct more specialized queries to specialized search engines or perform a search on a narrower set of web resources. For example, command processor 122 may search a set of food websites in response to a query for a recipe for spaghetti carbonara, a set of travel websites in response to a query for airline ticket prices to a given destination, a set of exercise websites in response to a query for a demonstration of a particular yoga pose, a personal organizer service in response to a query for events scheduled on a user's calendar for a given day, and so on.

In response, command processor 122 obtains a resource containing an answer to the query. The response may include, for example, audiovisual content, timing information, and so on. Upon obtaining the resource, command processor 122 passes the resource to response partitioning component 124 for further processing.

Response partitioning component 124 generally is configured to split a response resource into multiple parts to be output on a plurality of user devices 140. To determine how to split a resource into multiple parts, response partitioning component 124 obtains device capability and context information from the one or more user devices (e.g., from data transmitted with the command received from a user device 140). The device capability and context information can include, for example, the size of a display associated with each of the user devices, whether an audio output device is connected to a user device, if a user is looking at or directly manipulating a particular user device, haptic feedback abilities, and so on.

In some cases, response partitioning component 124 can calculate weighting scores for particular types of output (audio, visual, haptic, and so on). A weighting score calculated for audio output can, for example, be used to direct audio output to a device with a connected audio output device (e.g., a wired or wireless set of headphones). Weighting scores calculated for video output can, for example, be used to direct video output to a device with a large screen (e.g., a tablet) or a device that a user is actively manipulating and looking at (e.g., based on data received from a front-facing camera on a smartphone). In some cases, resource partitioning component 124 can generate haptic feedback based, for example, at least in part on timing information received in the response resource. Weighting scores calculated for haptic feedback can direct haptic feedback, for example, wearable devices or devices that a user is actively manipulating (e.g., determined from, at least in part, accelerometer data).

Based on the weighting scores and the one or more response partitions, response partitioning component 124 can output each portion of the response to one or more user devices through I/O interface 126. For example, response partitioning component 124 can output a video portion of the response to a first user device $140_1$ (e.g., a tablet that a user is looking at), an audio portion of the response to a second user device $140_2$ (e.g., a device with a connected set of headphones), a haptic portion to a third user device $140_3$ (e.g., a smartwatch), and so on.

In some cases, a designated master device may serve as the sole interface between user devices 140 and cloud service 120. Resource partitioning component 124 may continue to generate partitioned responses and instructions directing different partitions to different user devices 140. In such a case, the designated master device may serve as a pass-through entity to route each partition to a designated device. In another case, the master device itself may determine how to route a response for output on different user devices 140 in the local network 130. Resource partitioning component 124 may, for example, generate a partitioned response (e.g., generate audio, video, haptic, and other responses) and transmit the partitioned response to the designated master device. Alternatively, resource partitioning component 124 may transmit an unpartitioned response to the master device for partitioning and routing to one or more user devices 140 based on device capabilities and context, as described herein.

User devices 140 are generally user-controlled devices that can generate one or more commands (e.g., in voice files) and offload the commands for processing by cloud service 120. As illustrated, user devices 140 generally include one or more context information devices 142, policy engine 144, and I/O interface 146. In some cases, user devices 140 may each be connected to the same network; in other cases, some user devices 140 (e.g., smartwatches) may not have its own network adapter for connecting to internal network 130 and thus may depend on another user device (e.g., a mobile phone) for access to the external network 110 (and correspondingly, access to cloud service 120) via internal network 130.

User devices 140 may have a variety of form factors, and, as discussed above, each user device 140 may be an optimal device for offloading certain tasks and receiving feedback from a cloud service 120 in certain contexts. For example, a wearable device that provides haptic feedback may be a good device to use for indicating, during exercise, when a user should transition from one portion of a workout to another portion of the workout, but may not be a good device to use for displaying instructional videos for the workout. In another example, a tablet or phone may be a good device to use for displaying instructional videos for the workout, but may not be as effective in informing a user when to transition to different portions of a workout.

Context information devices 142 generally provide information about the context of a user device 140. For example, the context information devices 142 can provide information about remaining battery life, charging state (e.g., discharging, charging from a secondary battery, or charging from mains power), whether the device is moving (e.g., through accelerometers and/or gyroscopes), and so on. In some cases, context information devices 142 may additionally include user-facing cameras, which user device 140 can use to determine if a user is looking at the device when the device records a command to offload to cloud service 120 for processing. Context information devices 142 may also provide, for example, audio quality metrics that user device 140 can use to determine if an audio sample obtained at user device 140 is of sufficient quality (e.g., sufficient volume with distortion or clipping below a threshold value) to be transmitted to cloud service 120 for additional processing.

Policy engine 144 generally processes information from context information devices 142 at the user device 140 and peer user devices 140 to determine which user devices in internal network 130 are to transmit a command to cloud service 120. Policy engine 144 can select a number of user devices to transmit commands to cloud service 120, for example, based on a combination of values from the one or more context information devices 142 present on each user device 140. For example, policy engine 144 can generate a score for each of the user devices 140 in internal network 130 to determine which user devices 140 can transmit a command to cloud service 120. To calculate the score, policy engine 144 can apply a weighting to the values obtained from each of the context information devices 142 (e.g., via an application programming interface (API) that exposes data from each of the context information devices 142 to policy engine 144) associated with a user device 140. For example, policy engine 144 may assign a high weighting to remaining battery life and whether or not a user device is connected to mains power, while assigning a lesser weighting to signal strength (e.g., in a wireless local area network where user devices 120 are connected to the same access point). Additionally, policy engine 144 can use data from devices such as accelerometers, gyroscopes, GPS data, and so on to determine if a particular device is a suitable candidate for offloading a command to a cloud service 120. For example, accelerometers in a wearable device may indicate when a user has raised the user's arm to use the wearable device, and thus may additionally indicate that a user is speaking into a microphone incorporated into the wearable device. In another case, GPS data can indicate that a user is driving, and thus may indicate that a watch would not be a suitable candidate for offloading commands to or presenting data from a cloud service 120.

In some cases, policy engine 144 at a local user device 140 may use data from the local user device 140 and peer user devices 140 to select a master device in local network 130. The designated master device in local network 130 may be the sole device in local network 130 that transmits commands to cloud service 120 for processing. For example, policy engine 144 may request network connectivity data (e.g., signal strength, access to external networks, bandwidth, and so on) and power information (e.g., remaining battery life, charging status, and so on) from each of the user devices 140. Upon selecting a master device (e.g., a device with high signal strength and bandwidth that draws power from electrical mains), each of the user devices 140 receive information indicating that the user devices 140 are to transmit commands to the designated master device to be offloaded to cloud service 120.

In some cases, the designated master device may periodically request context information from each of the user devices 140 in local network 130. Using the context information, the master device can determine how to partition a response from cloud service 120 into one or more portions to be output on different user devices 140. For example, the designated master device could partition a guided workout video into three portions: a video portion, an audio portion, and a haptic portion. The master device can use the context information provided from each of the user devices to determine which device(s) a user is looking at, which device(s) are connected to an audio output device (e.g., headphones), and, if present, whether a user is wearing a device that provides haptic feedback. Subsequently, the master device can transmit the video portion to a first device (e.g., a tablet), the audio portion to a second device (e.g., a smartphone connected to a pair of headphones), and the haptic portion to a third device (e.g., a wearable device). In some cases, the master device can transmit the same portion to multiple devices, which may allow multiple devices to present the same data to a user.

I/O interface 146 generally allows a user device 140 to transmit commands to a cloud service 120 (e.g., through a designated master device), receive response from cloud service 120, and inform peer user devices 140 in internal network 130 of device capabilities and contextual information that can be used to select one or more devices to transmit and receive data from cloud service 120, as discussed above. In an example, a first I/O interface 146 (e.g., a Bluetooth interface) can be used to share device capabilities and contextual information between user devices 140. A second I/O interface 146 (e.g., a Wi-Fi interface) can be used to transmit commands from user devices 140 to a designated master device and/or cloud service 120.

Figure 2:
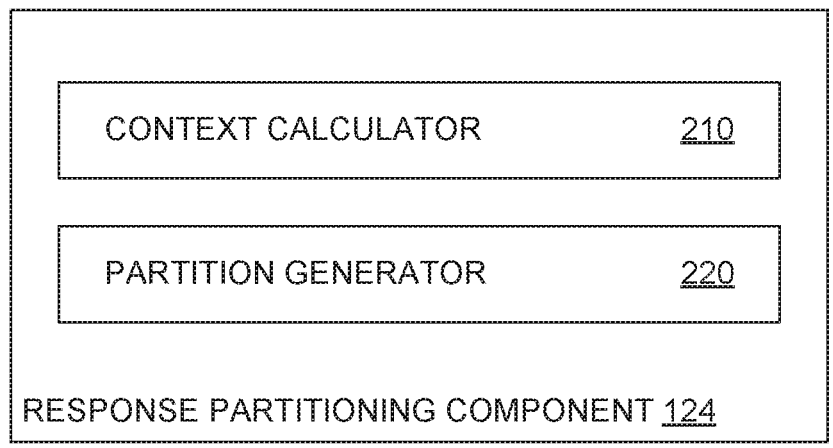
FIG. 2 illustrates an example response partitioning component for splitting a response to a user command into a plurality of discrete parts, according to one embodiment.

FIG. 2 illustrates a block diagram of an example response partitioning component 124, according to one embodiment.

As illustrated, response partitioning component 124 generally includes a context calculator 210 and a partition generator 220.

Context calculator 210, as described above, generally receives device capability and context information from one or more user devices 140 to determine weighting scores for each device. As discussed above, context calculator 210 can calculate weighting scores for different types of response data (e.g., for video, audio, haptic feedback, and so on). For example, context calculator 210 can calculate weighting scores to direct video data to a user device 140 with a large screen (e.g., a tablet device) and/or a user device 140 that a user is looking at. Context calculator 210 can additionally calculate weighting scores to direct audio data to a user device 140 that is connected to an audio output device (e.g., headphones), to direct haptic feedback to user devices 140 that a user is actively manipulating or wearing, and so on.

Partition generator 220 is generally configured to divide a response to a user query into a plurality of parts. As described above, an example partitioning may include an audio partition, a video partition, a haptic feedback partition, and so on. Based on the weighting scores generated at context calculator 210, partition generator 220 can transmit different response partitions to different user devices 140. For example, partition generator 220 can transmit an audio partition of the response to the user device 140 with the highest weighting score for audio feedback, a video partition of the response to the user device 140 with the highest weighting score for video feedback, a haptic feedback partition of the response to the user device 140 with the highest weighting score for haptic feedback, and so on. In some cases, partition generator 220 can transmit all of the response partitions to a designated master device, along with partitioning information indicating one or more recipients for each of the response partitions. The designated master device can use the partitioning information to direct different response partitions to the devices selected by context calculator 210 and partition generator 220.

Figure 3:
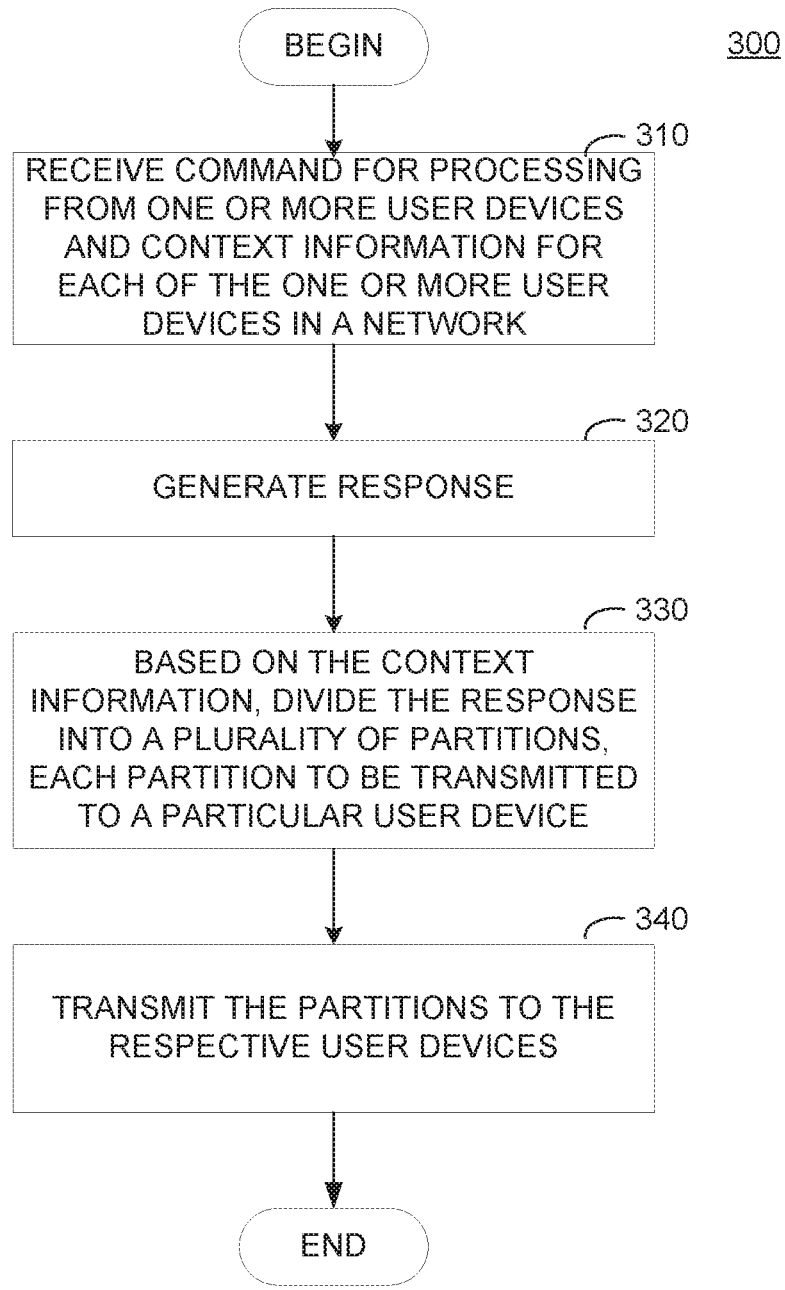
FIG. 3 illustrates example operations that may be performed by a cloud service to generate a partitioned response to a command received from a user device based, at least in part, on context information associated with the device, according to one embodiment.

FIG. 3 illustrates example operations 300 that may be performed by a cloud service to generate a response to a user command and partition the response into one or more partitions for output on different user devices, according to one embodiment. As illustrated, operations 300 begin at step 310, where a cloud service receives a command for processing from one or more user devices and context information for each of the one or more user devices in a network. The command, as discussed above, may be an audio or video file that the cloud service parses to generate a textual search query. Using the textual search query, the cloud service can search for an answer over a wide set of web resources (e.g., for a generalized query) or a specialized set of resources (e.g., for narrower queries).

At step 320, the cloud service generates a response to the command. The cloud service, for example, can generate a response including an audio component and a visual component. In some cases, the cloud service can additionally generate a haptic feedback component as part of the response. For example, in response to a query for instructions on how to make a spaghetti carbonara, the haptic feedback can include, for example, a set of times (e.g., as offsets from when a user device receives the response) at which the user device should vibrate.

At step 330, the cloud service divides the response into a plurality of partitions based on the context information. As discussed above, the cloud service generally uses information about device context (and capabilities) to divide and direct portions of a response to appropriate user devices. For example, as discussed above, the cloud service can use information about which device a user is looking at (e.g., from facial recognition of inputs from a front-facing camera) to generate a video portion of a response to be output on that device. Meanwhile, the cloud service can use information about what devices are connected to audio output devices (e.g., headphones, external speakers, etc.) to direct audio output to a specific device, and so on. At step 340, the cloud service transmits the partitions to the respective user devices.

Figure 4:
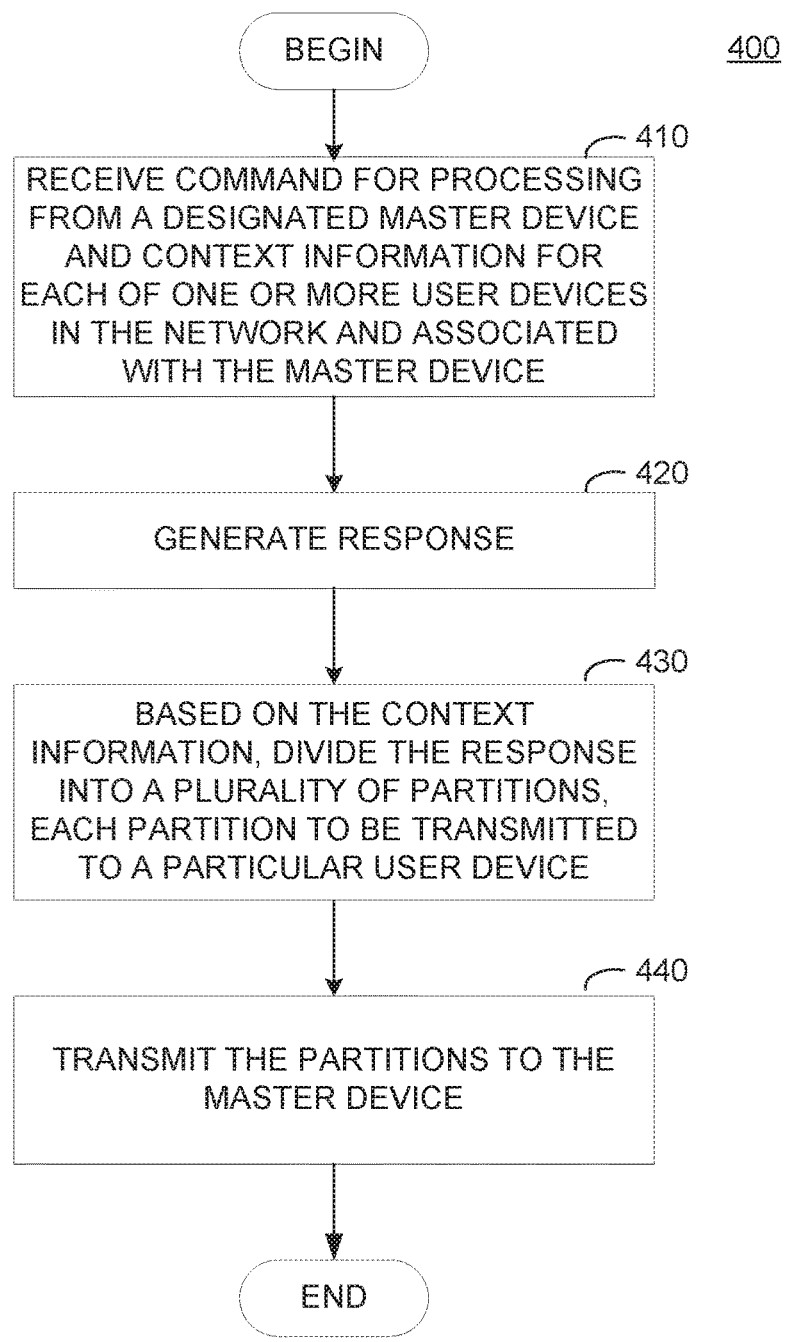
FIG. 4 illustrates example operations that may be performed by a cloud service to generate a response and partitioning information used by a master device to divide the response into a plurality of discrete parts, according to one embodiment.

FIG. 4 illustrates example operations 400 that may be performed by a cloud service to partition a response to a command and transmit the partitioned response to a designated master device, according to one embodiment. As illustrated, operations 400 begin at step 410, where the cloud service receives a command for processing from a designated master device. The cloud service additionally receives, from the master device, context information for each of the one or more user devices in an internal network associated with the master device. The command, as discussed above, may be an audio or video file that the cloud service parses to generate a textual search query. Using the textual search query, the cloud service can search for an answer over a wide set of web resources (e.g., for a generalized query) or a specialized set of resources (e.g., for narrower queries).

At step 420, the cloud service generates a response to the command. As discussed above, the cloud service, for example, can generate a response including an audio component and a visual component. In some cases, the cloud service can additionally generate a haptic feedback component as part of the response. For example, in response to a query for instructions on how to make a spaghetti carbonara, the haptic feedback can include, for example, a set of times (e.g., as offsets from when a user device receives the response) at which the user device should vibrate.

At step 430, the cloud service divides the response into a plurality of partitions based on the context information. Each partition may be intended for transmission to a particular user device. As discussed above, the cloud service generally uses information about device context (and capabilities) to divide and direct portions of a response to appropriate user devices. For example, as discussed above, the cloud service can use information about which device a user is looking at (e.g., from facial recognition of inputs from a front-facing camera) to generate a video portion of a response to be output on that device. Meanwhile, the cloud service can use information about what devices are connected to audio output devices (e.g., headphones, external speakers, etc.) to direct audio output to a specific device, and so on. Finally, at step 440, the cloud service transmits the partitions to the user device. In some cases, the cloud service may additionally provide routing information to the user device, which the user device can use to send the appropriate partitions to the user devices identified in the routing information.

Figure 5:
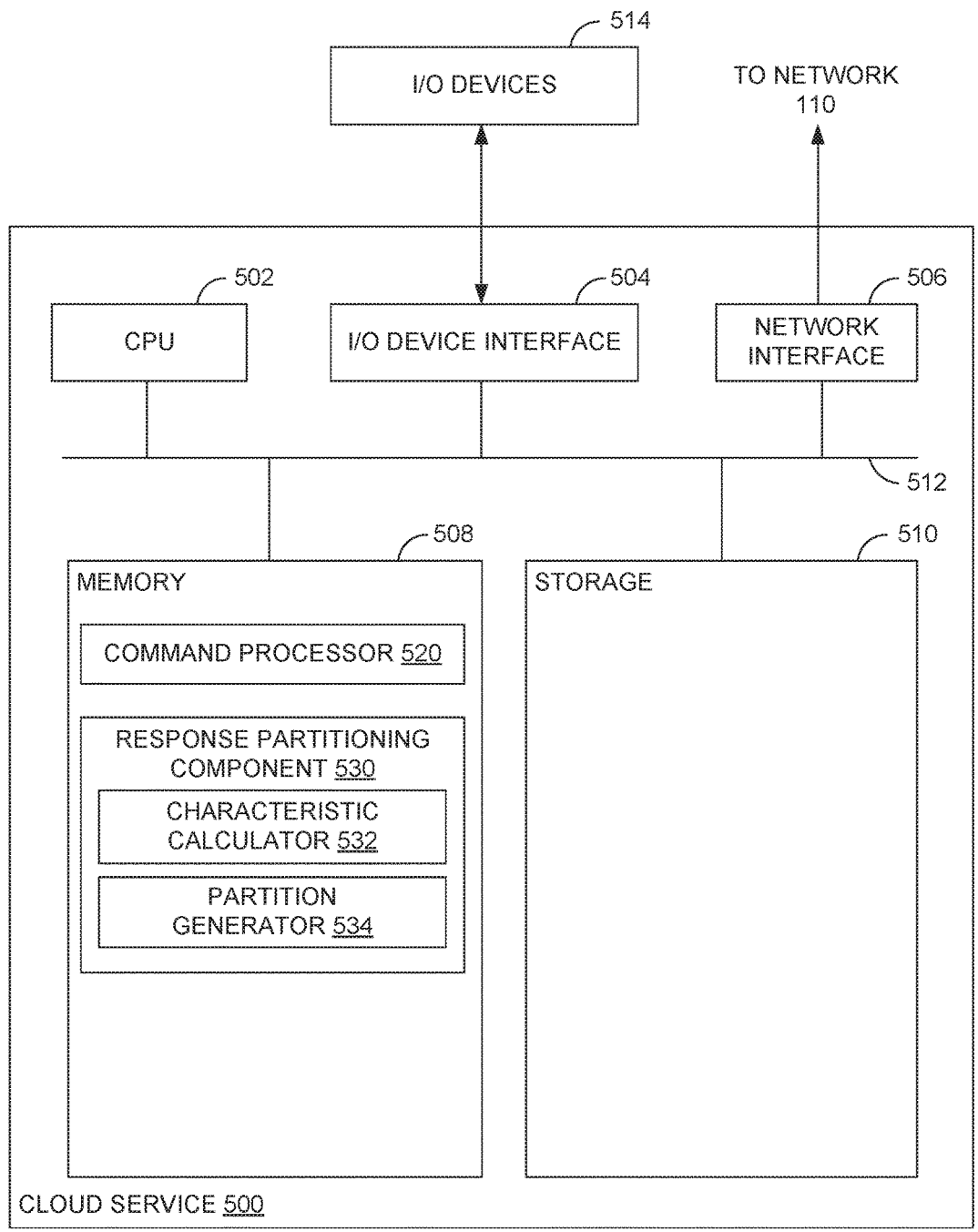
FIG. 5 illustrates an example system in which context information is used to partition a response to a command received from a user device based, at least in part, on context information associated with the device, according to one embodiment.

FIG. 5 illustrates an example user device 500 that cooperates with other peer devices (e.g., connected to the same network) to select one or more device to offload a command for processing by a cloud service, according to an embodiment. As shown, the server includes, without limitation, a central processing unit 502, one or more I/O device interfaces 504, which may allow for the connection of various I/O devices 514 (e.g., keyboards, displays, mouse devices, pen input, etc.) to the computing system 500, network interface 506, a memory 508, storage 510, and an interconnect 512.

Figure 6:
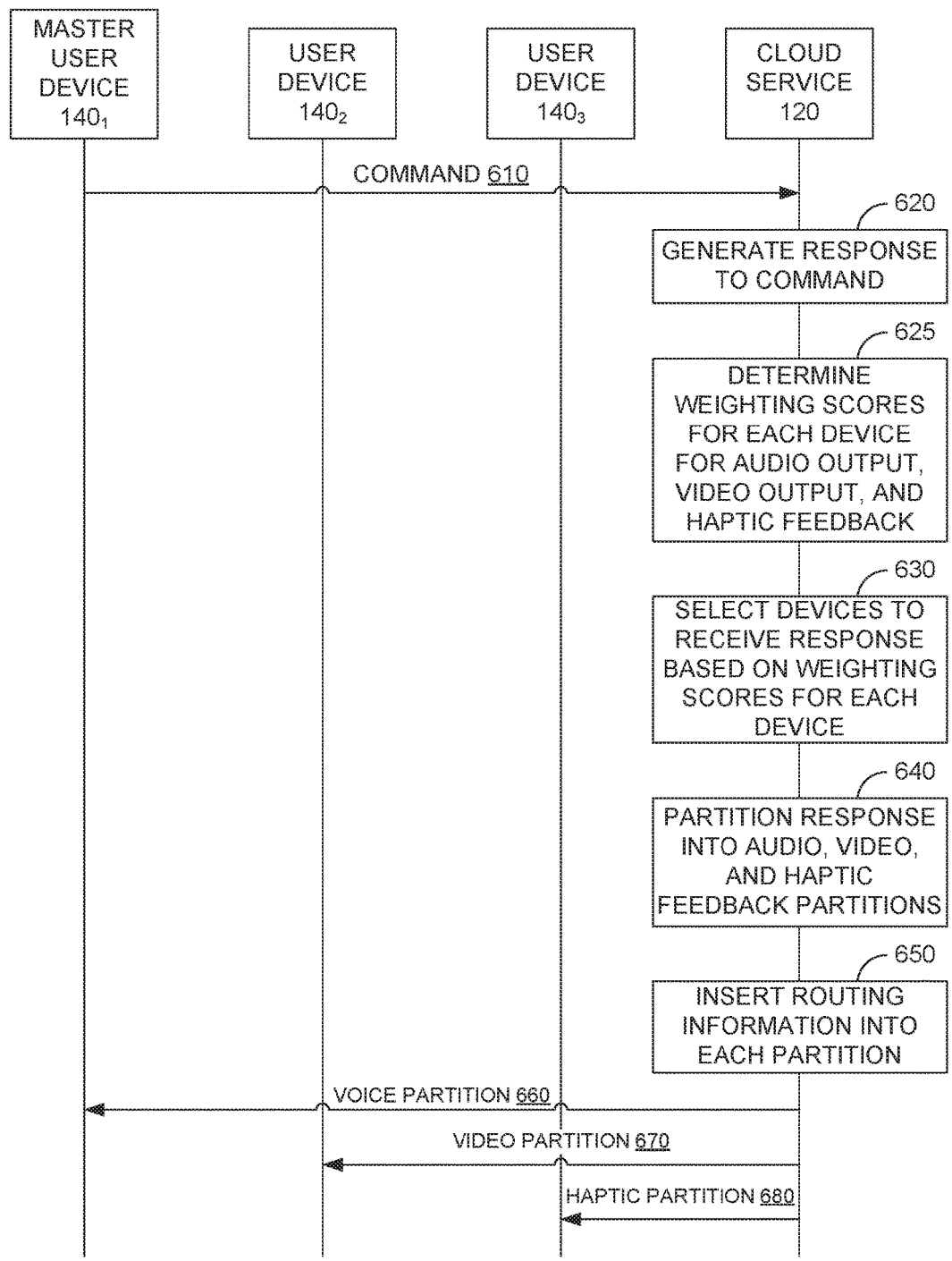
FIG. 6 illustrates a message flow diagram of messages that may be exchanged between user devices and a cloud service to output portions of a response on different user devices, according to an embodiment.

FIG. 6 illustrates a message flow diagram of example messages that may be exchanged between one or more user devices 140 and a cloud service 120 to generate a response to a command, partition the generated response, and instruct different user devices 140 to output different partitions of the generated response, according to an embodiment. As illustrated, message flow 600 begins with master device $140_1$ transmitting a command to cloud service 120. The command generally includes a user-generated query for information from the cloud service 120.

At 620, cloud service 120 generates a response to command 610. The response may include a video portion, an audio portion, and a haptic feedback portion, which, as described in further detail herein, may be partitioned for output on one or more of the user devices 140. After generating the response to command 610, at step 625, cloud service 120 determines weighting scores for each device in the group of user devices for each of audio output, video output, and haptic feedback. The weighting scores may be selected based on context information about the group of user devices. The context information for a user device may comprise information about capabilities of the user device and information about whether a user is interacting with the user device. The capabilities of the user devices may comprise information about a device display size, an ability to play back audio via a connected audio output device, and an ability to output haptic feedback, among others. The weighting score for audio output may be based at least on a connection to an audio output device and audio quality of the device. The weighting score for video output may be based on at least screen size and information about whether the user is looking at or actively manipulating device. The weighting score for haptic feedback may be based at least on whether the device is a wearable device and information about whether the user is actively manipulating the device. At step 630, cloud service 120 selects devices to receive a response (or portion of the response). The selection of devices to receive a response may, in some cases, be based on weighting scores for each device (e.g., cloud service 120 selects devices with a highest output score to output a specific type of data). As discussed herein, an output score for each of user devices $140_1$, $140_2$, and $140_3$ may represent how suitable a particular device is for outputting a particular type of output.

At 640, cloud service 120 partitions the response into audio, video, and haptic feedback partitions. For each partition, at 650, cloud service 120 inserts routing information to direct each partition of the response to a user device 140. The routing information may be inserted, for example, based on the selection of devices to receive a response at 630. As illustrated, a video partition 660 may be directed to user device $140_1$, a video partition 670 may be directed to user device $140_2$, and a haptic partition 680 may be directed to a user device $140_3$. Cloud service 120 can output the partitions to the associated devices and instruct those devices to output the received data to a user.

CPU 502 may retrieve and execute programming instructions stored in the memory 508. Similarly, the CPU 502 may retrieve and store application residing in the memory 508. The interconnect 512 transmits programming instructions and application data among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a command processor 520 and a response partitioning component 530. As discussed above, command processor 520 receives a command (e.g., an audio file or a video file) from one or more user devices. Command processor 520 can parse the received command and generate a textual query based on the parsed command. As discussed above, command processor 520 can search across a set of web resources based on the command; command process 520, for example, can search across a wide set of resources in response to more generalized commands and can search across a narrow set of resources in response to more specific commands. After executing a search operation based on the textual query, command processor 520 can generate a response to be processed by response partitioning component 530. The response may include, for example, an audio component, a video component, haptic feedback components, and so on.

Response partitioning component 530 is generally configured to divide the response generated by command processor 520 into one or more partitions for output to a selected group of user devices. Response partitioning component 530 generally includes a characteristic calculator 532 and a partition generator 534. As discussed above, characteristic calculator 532 generally uses characteristic information provided for each of the one or more user devices in a network to determine which of the user devices are suitable to output different portions (e.g., audio, visual, haptic feedback, and so on) of a response. In some cases, characteristic calculator 532 can generate scores for different types of data based on, for example, whether a user is looking at a device or whether audio output devices are connected to a device. Characteristic calculator 532 subsequently selects the devices with the highest score to output a particular type of data.

Partition generator 534 is generally configured to split a response into discrete partitions corresponding to a type of data to be transmitted and output at a user device. In some cases, partition generator 534 can transmit different types of data to the appropriate user device. In other cases, partition generator 534 can send a package including each of the response partitions and information indicating output destinations for each of the response partitions to a designated master device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the entity analytics system) or related data available in the cloud. For example, the entity analytics system could execute on a computing system in the cloud and determine relationships between different entities stored in the entity analytics system, for example, based on determining relationships between sub-entities. In such a case, the entity analytics system could receive an input specifying parameters for the entity analytics system to search for and determine relationships between entities and store information about the determined relationships at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for processing commands offloaded from a user device to a cloud service, comprising:
receiving a command to be processed by the cloud service from a first device of a group of user devices;
generating a response based on the command;
determining weighting scores for each device in the group of user devices for each of audio output, video output, and haptic feedback, the weighting scores being based on context information about the group of user devices, wherein:
the context information comprises information about capabilities of the user device and information about whether a user is interacting with the user device,
the capabilities of the user device comprises one or more of information about a device display size, an ability to play back audio via a connected audio output device, or an ability to output haptic feedback, the weighting score for audio output is based at least on a connection to an audio output device and audio quality of the device,
the weighting score for video output is based at least on screen size and information about whether the user is looking at or actively manipulating the device, and
the weighting score for haptic feedback is based at least on whether the device is a wearable device and information about whether the user is actively manipulating the device;
selecting a plurality of user devices from the group of user devices to receive at least part of the response based on the determined weighting scores for each device in the group of devices, wherein the selected plurality of devices correspond to devices having a highest weighting score for audio output, video output, and haptic feedback;
partitioning the response into a plurality of portions corresponding to each of the selected plurality of user devices, wherein the plurality of portions comprises at least a first portion corresponding to audio data in the response, a second portion corresponding to video data in the response, and a third portion corresponding to haptic feedback data in the response; and
instructing each of the selected plurality of user devices to output the one or more portions corresponding to the selected plurality of user devices by transmitting the plurality of portions to the corresponding selected plurality of user devices.

2. The method of claim 1, wherein the selecting the plurality of user devices comprises:
for a type of output, generating a score for each device in the group of user devices based on the context information associated with each device; and
identifying a device with a highest score as the selected user device for the type of output.

3. The method of claim 1, wherein the plurality of selected user devices comprises a designated master device of the one or more user devices.

4. The method of claim 3, wherein the partitioned response comprises routing information identifying one or more user devices to receive each partition of the partitioned response.

5. The method of claim 1, wherein the context information comprises differences from previously transmitted context information stored at the cloud service.

6. The method of claim 1, wherein the context information includes data from one or more sensors at a user device indicating that a user is actively manipulating the user device.

* * * * *